D. P. DAVIES.
DRIVE MECHANISM FOR TRACTION ENGINES.
APPLICATION FILED MAY 25, 1912.
1,217,284.
Patented Feb. 27, 1917.
3 SHEETS—SHEET 1.
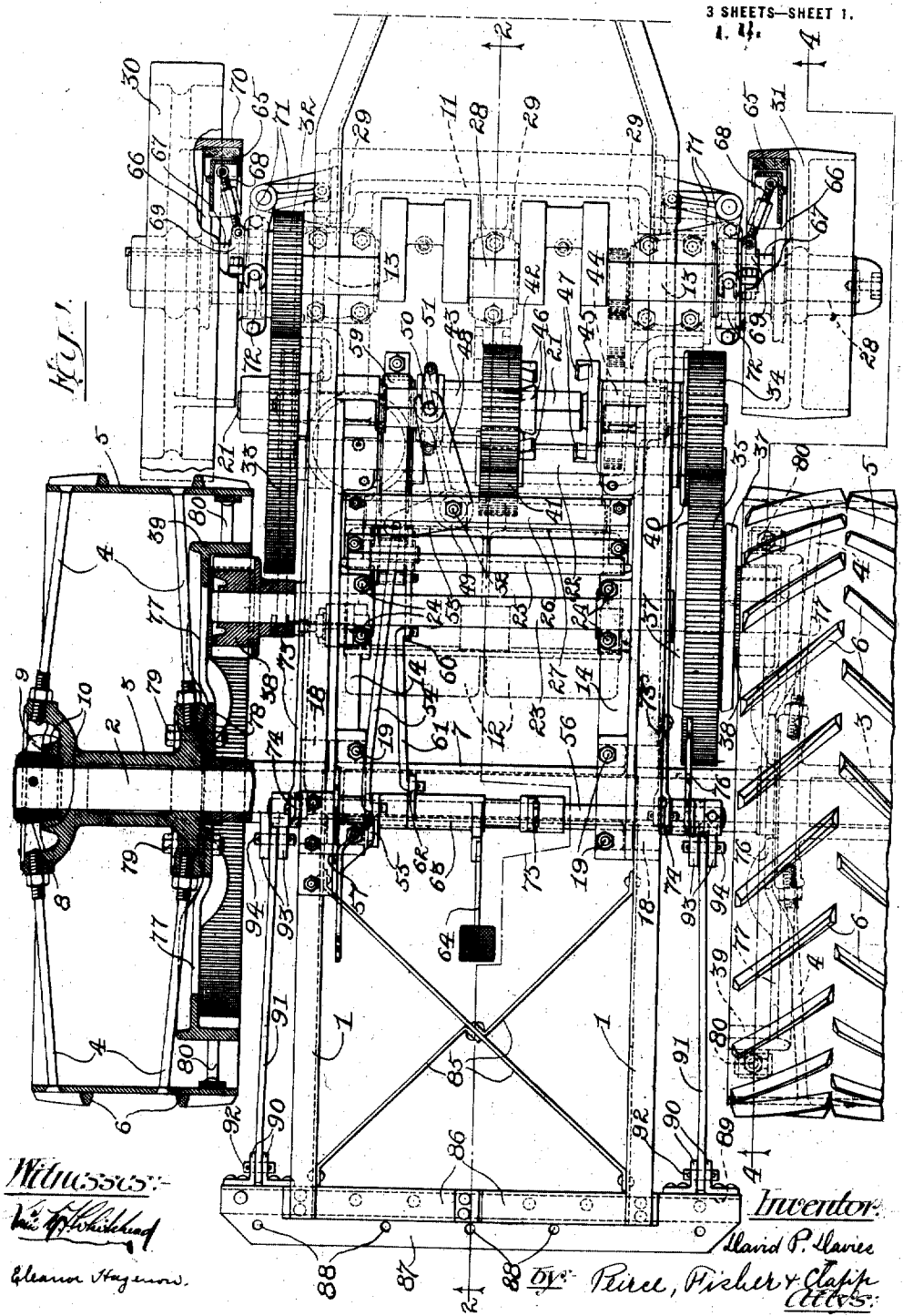

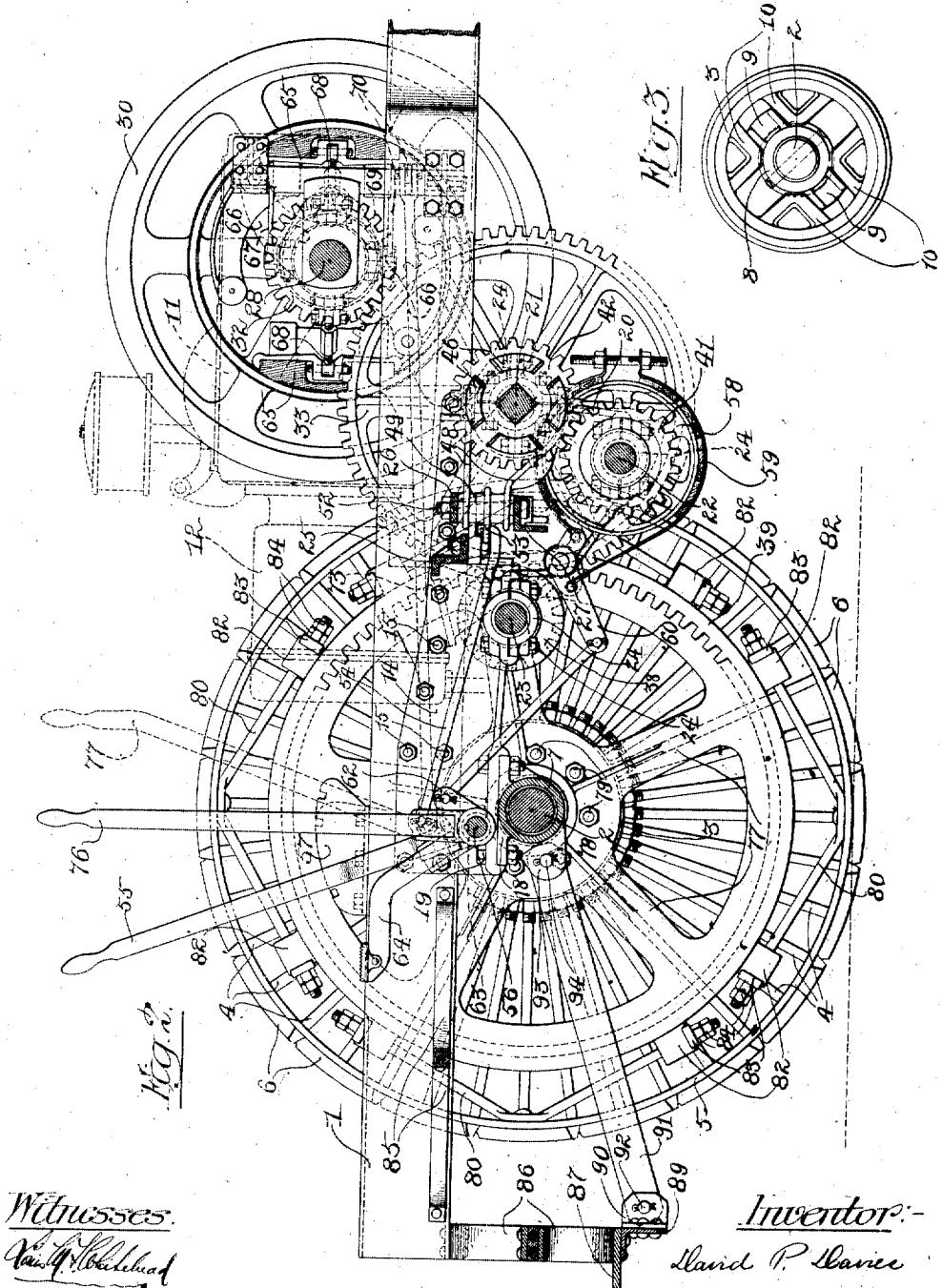

D. P. DAVIES.
DRIVE MECHANISM FOR TRACTION ENGINES.
APPLICATION FILED MAY 25, 1912.
1,217,284.
Patented Feb. 27, 1917.
3 SHEETS—SHEET 3.
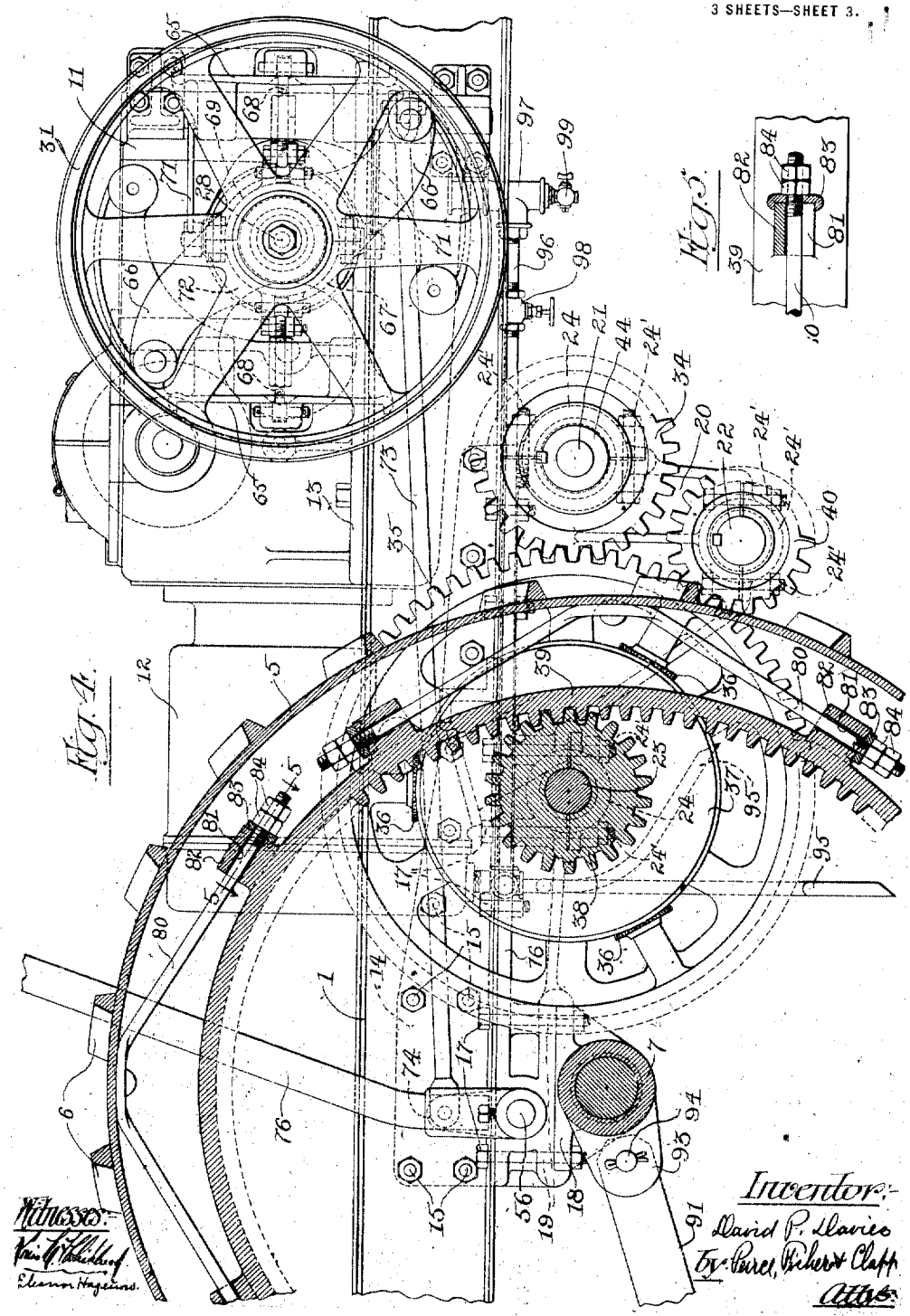

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

DRIVE MECHANISM FOR TRACTION-ENGINES.

1,217,284.  Specification of Letters Patent.  Patented Feb. 27, 1917.

Application filed May 25, 1912. Serial No. 699,779.

*To all whom it may concern:*

Be it known that I, DAVID P. DAVIES, a citizen of the United States, and a resident of Racine, in the county of Racine and State of Wisconsin, have invented certain new and useful Improvements in Drive Mechanism for Traction-Engines, of which the following is a full, clear, and exact description.

The invention relates to drive mechanism for traction engines and more particularly to drive mechanism for tractors employing explosive or internal combustion motors. The invention seeks to improve the construction and arrangement of parts and consists in the features of improvement hereinafter set forth, illustrated in the preferred form in the accompanying drawings and more particularly pointed out in the appended claims.

In the drawings, Figure 1 is a plan view of the improved tractor with the motor shown in dotted lines and parts shown in section to illustrate the construction. Fig. 2 is a longitudinal section on line 2—2 of Fig. 1. Fig. 3 is a view in elevation of the hub of one of the traction wheels showing the manner of connecting the same to its axle. Fig. 4 is a longitudinal section on line 4—4 of Fig. 1. Fig. 5 is a detail section on line 5—5 of Fig. 4.

The frame of the machine comprises two horizontal sills 1 which are preferably formed of heavy steel channel bars. The forward ends of the sills are contracted and supported upon suitable steering wheels, which are not shown, and which may be of any suitable construction. The rear traction wheels are mounted upon the ends of the axle 2 and comprise cast metal hubs 3, spokes 4 and rims 5. The tread surfaces of the rims are preferably provided with projecting ribs 6. The axle 2 extends through a sleeve 7 which is preferably formed of cast steel and which extends beneath and is connected at its ends to the side bars or sills 1. The axle is journaled in bearings formed at the ends of the sleeve 7 and the latter also serves as a bracing connection between the side bars or sills, so that, in effect, the sleeve forms a part of the frame. The wheels are mounted on the outer projecting ends of the axle 2 and are held in place by cap pieces 8 pinned to the ends of the axle. One of these cap pieces (see Fig. 3) is provided with projecting lugs 9 which extend between ribs 10 upon the outer face of the hub 3 of the wheel, so that the wheel is fixed to the axle. The corresponding cap-piece of the other wheel is not provided with corresponding lugs, so that while one of the wheels is fixed to the axle, the other is loosely mounted thereon.

The motor is of the explosive or internal combustion type and comprises a crank casing 11 and horizontally disposed cylinders 12 secured to the rear end thereof. The motor is mounted on the frame in front of the rear driving axle and the crank casing therefor fits between the side bars or sills 1. Laterally projecting flanges 13 (see Fig. 4) on the crank casing overlap the upper flanges of the side-bars and are bolted thereto. The crank casing thus serves as a rigid connection between the side bars or sills of the frame.

The bearing sleeve 7 does not directly engage the side bars or sills 1, but is secured to the rear ends of two heavy castings 14 which in turn are connected to the side sills. These castings are provided with upwardly extending flanges which abut against the inner faces of the side bars 1 and are secured thereto by bolts 15. The castings are also provided (see Fig. 4) with outwardly projecting flanges 16 which extend beneath the lower flanges of the side bars and are connected thereto by bolts 17. The bearing sleeve 7 for the rear axle is provided at its ends and at its upper portion with flanges 18 which set within seats on the under sides and at the rear ends of the castings 14. Two of the bolts 17 (see Fig. 4) and two additional bolts 19 extend through the flanges 18 and firmly secure the sleeve bearing 7 for the rear axle to the castings 14 and to the side bars or sills 1. The castings 14 extend forwardly from the driving axle 2 and are provided at their forward ends with depending portions 20. These castings are provided with bearings for three transverse counter shafts 21, 22 and 23. Cap pieces 24 connected to the castings by bolts 24' hold the counter shafts in position. The castings 14 are connected adjacent their forward ends by three transverse bars 25, 26 and 27 (see Figs. 1 and 2) which are bolted at their ends to projecting lugs on the inner faces of the castings. In the construction shown, the bar 25 is a Z-bar; the bar 26 is flat; and the cross-connection 27 is in the form of an angle bar.

The engine crank shaft 28 is journaled in suitable bearings 29 in the crank casing. At one end it is provided with a heavy flywheel 30 which is keyed thereto and at its opposite end with a loose belt pulley 31. A spur pinion 32 is loosely mounted on the left-hand end of the crank shaft 28 between the crank casing and the fly-wheel 30. This pinion 32 meshes with the teeth of a gear 33 which is fixed to the adjacent end of the counter shaft 21. At its opposite end, the shaft 21 is provided with a spur pinion 34 which meshes with the main gear wheel 35 of a differential gear on the counter shaft 23. The gear wheel 35 is loose on the counter shaft 23 and carries a series of beveled pinions 36 which mesh with two opposed beveled gears 37. The counter shaft 23 carries pinions 38 at its ends which mesh with large, internally toothed gears 39 which are mounted on the traction wheels. The pinion 38 at the left-hand side of the machine and the inner beveled gear 37 are fixed to the counter-shaft 23. The other beveled gear 37 and pinion 38 are loosely mounted thereon, but are formed in one piece with one another or otherwise rigidly connected.

The second counter shaft 22 between the engine shaft and the shaft 23 is provided at its right-hand end with a pinion 40 which, like the pinion 34 of the counter shaft 21, meshes with a large gear 35 of the differential. Intermediate its ends the shaft 22 is provided with a pinion 41 which is arranged to coöperate with a pinion 42 on the counter shaft 21. The latter is slidably mounted upon the counter shaft 21, but is connected to rotate therewith. Preferably, the central portion of the shaft 21 is square in section (see Figs. 1 and 2) and the gear 42 is provided with a sleeve-like hub 43 having a correspondingly shaped opening. By shifting the gear 42, the intermediate counter shafts 21 and 22 may be connected and disconnected.

The shifting gear also serves to connect and disconnect the counter shaft 21 and the pinion 34 thereon. The pinion 34 (see Figs. 1 and 4) is keyed on the end of a sleeve 44, the sleeve being loose on the shaft 21 and journaled within the bearing on the side frame or casting 14. At its inner end the sleeve 44 is provided with a clutch disk 45 having teeth 47 thereon. The adjacent face of the gear 42 is provided with projecting clutch teeth 46 which are arranged to coöperate with the clutch disk 45 to connect and disconnect the shaft 21 and the pinion 34.

The pinion 42 carrying the clutch teeth 47 is shifted by a pair of arms 48 (see Figs. 1 and 2) which are mounted on a hub 49, and the outer, forked ends of which engage pins 50 that project from a collar 51 on the sleeve or hub 43 of the pinion 42. The hub 49 of the arms 48 is held between the transverse bars 26 and 27 by a vertical pivot bolt 52 and this hub is provided with a laterally projecting arm 53 which is connected by a rearwardly extending link 54 to an operating lever 55. The operating lever is loosely mounted upon a transverse shaft 56 which extends beneath the side bars or sills 1 and is journaled in suitable bearings in the rear ends of the castings 14.

By means of the lever 55, the pinion 42 may be shifted into and out of engagement with the pinion 41 and also into and out of engagement with the clutch disk 45; or the pinion 42 may be held in intermediate idle position out of engagement with the clutch disk 45 and also out of engagement with the pinion 41. When the pinion is in engagement with the clutch disk the machine is driven in forward direction. At such time the counter shaft 22 and pinions 40 and 41 thereon run idle. When the pinion 42 is in engagement with the pinion 41, it is necessarily disengaged from the clutch disk 45, the pinion 34 runs idle and the traction wheels are driven in reverse direction through the medium of the differential and the pinion 40 on the counter shaft 22. In the intermediate position of the pinion 42, the motion of all the shafts except that of the engine shaft and the counter shaft 21 is arrested. Suitable means are preferably provided for holding the clutch pinion 42 in its three positions. In the form shown, a segment 57 is secured to the side bar 1 adjacent the lever 55 and the latter is provided with the ordinary dog or latch (not shown) for engaging the segment.

In the construction shown, the counter shaft 22 is provided with a brake wheel 58. A brake band 59 thereon is operated by a lever 60 and the latter is connected by a link 61 to an arm 62 on a sleeve 63. The sleeve 63 is loosely mounted on the shaft 56 and is provided with a foot treadle 64.

The entire driving gear is thrown into and out of operation by a friction clutch which serves to connect the engine shaft 28 and the drive pinion 32 which is loosely mounted thereon. As stated, the belt pulley 31 is loosely mounted on the opposite end of the engine shaft and this pulley and the pinion 32 are adapted to be connected with and disconnected from the shaft by similar clutch mechanisms. Each of these clutch mechanisms comprises wooden faced shoes 65 which are pivoted upon projecting arms 66 on sleeves 67 and which are radially shifted by links 68 connected to sliding collars 69. The sleeve 67 at the left-hand side of the machine is fixed to the pinion 32 and the clutch shoes are arranged to engage the internal friction surface of a flange 70 on the fly-wheel 30. In the clutch at the opposite end of the engine shaft, the sleeve 67 is keyed to the shaft and the shoes are arranged to engage a friction surface on the inner face of the pulley 31. These clutches are shifted by bell cranks 71 which engage the collars 72 on the sleeves 69. Rods 73 extend rearwardly to crank arms 74 on the shaft 56. One of these arms is fixed to the end of the shaft 56 and an operating lever 75 also fixed to the shaft serves to throw the clutch which connects and disconnects the drive pinion 32 and the engine shaft 28. The other arm 74 is connected to the hub of a lever 76 and the latter is shifted to connect and disconnect the pulley 31 on the engine shaft, so that a threshing or other similar machine operated from the engine can be started and stopped.

The gears 39 on the traction wheels are provided with spokes 77 and flat, hublike portions 78 which abut against the inner faces of the wheel hubs 3 and are secured thereto by bolts 79. The gears are also secured to the rims 5 of the traction wheels by a series of bolts 80. These bolts are each bent intermediate its ends and are riveted or otherwise connected at such points to the wheel rims. The ends of the bolts extend through open sided slots 81 of a series of lugs 82 formed on the outer periphery of the gear 39. A U-shaped cap piece 83 fits over the end of each bolt 80 and over the adjacent end of the lug 82 and nuts 84 threaded on the end of the bolt hold the cap piece in position and secure the bolt to the lug 82.

In assembling these parts, the bolts are first secured to the rims of the wheels and the gears placed in position with the slotted lugs 82 engaging the ends of the bolts. The hubs of the gears are then bolted to the wheel hubs 3 and the cap pieces 83 and nuts 84 are then placed in position. This arrangement of the caps prevents the lateral displacement of the bolts 80 from the slotted lugs 82.

In the rear of the wheel axle the side bars or sills 1 are connected by horizontally disposed, inclined brace bars 85 which carry a platform. Similar vertically disposed brace bars 86 extend downwardly from the rear ends of the side bars or sills 1 to a transverse traction bar 87. This bar is provided with openings 88 for engagement with draft chains or like couplings to which the load to be drawn by the traction engine is secured. Beneath the bar 87 extends an angle bar 89 which is bolted in position and the end of the angle bar is provided with L-shaped clips 90. Links 91 are connected to these clips 90 by pins 92 and extend upwardly and forwardly therefrom to the sleeve bearing for the main axle. As shown, the latter is provided with rearwardly projecting, perforated lugs 93 between which the upper ends of the links 91 extend and to which they are connected by pins 94. By this arrangement the transverse coupling or traction bar 87 is directly connected to the main bearing of the axle whereon the traction wheels are mounted.

The cylinders 12 of the motor rest loosely upon the transverse Z bar 25, so that they are properly supported but are free to expand and contract as they are heated and cooled.

The construction is extremely rigid, strong and compact. The counter shafts are journaled in the side castings which are rigidly bolted to the sills and the latter are firmly connected by the engine casing and the axle bearing 7, so that the gears of the driving mechanism are maintained in proper alinement. By shifting the clutch pinion 42 the transmission gear is adapted for either going ahead or in rearward direction. If the engine is running, the friction clutch coöperating with the fly-wheel 30 is disengaged before the pinion 42 is shifted, the lever 75 is then shifted to throw in the friction clutch and connect the gear wheel and the fly-wheel 30 and the engine crank shaft. If the tractor is employed for driving threshing or other similar machines, this clutch is disengaged to throw all the transmission gear out of operation, and the other friction clutch is engaged to connect the belt pulley 31 to the engine shaft. When the machine is employed for traction purposes, this latter clutch may be engaged at all times so that the belt pulley will act as a supplemental fly-wheel. It is loose on the engine shaft and is connected thereto and disconnected therefrom by a friction clutch in order that the threshing or other similar machines operated by the motor can be started and stopped.

The bull-gears 39 on the traction wheels are lubricated with waste oil from the engine crank casing by means of two branch pipes 95 connected to and depending from a horizontal pipe 96, (see Fig. 3). The pipe 96 is connected to a vertical pipe 97 which leads from the lower portion of the crank casing 11 of the engine and the branch pipe 95 delivers the oil onto the internal, toothed faces of the gears 39. The pipe 96 is provided with a controlling valve 98, and the pipe 97 is provided at its lower end with a cock 99.

It is obvious that numerous changes may be made in the details set forth without departure from the essentials of the invention as defined in the claims.

I claim as my invention:—

1. In drive mechanism of the class described, the combination with a driven member, of a drive shaft, a parallel reversing shaft permanently geared to said driven member, a clutch member loosely mounted on said drive shaft and permanently geared to said driven member, a companion clutch member slidably mounted on and rotating with said drive shaft, and coöperating gears on said reversing shaft and on said sliding clutch member arranged to be engaged when said clutch members are disengaged, substantially as described.

2. In drive mechanism of the class described, the combination with a driven member, and a motor shaft, of a counter shaft and a reversing shaft both parallel to said motor shaft, clutch controlled gearing for connecting said motor shaft to said counter shaft, a loose clutch member on said counter shaft, a coöperating clutch member slidably mounted on and rotating with said counter shaft, gearing permanently connecting said loose clutch member and said reversing shaft to said driven member, coöperating gears on said reversing shaft and on said sliding clutch member, and means for shifting the latter in opposite direction from idle position to operatively connect said counter shaft to said loose clutch member or to said reversing shaft, substantially as described.

3. In drive mechanism of the class described, the combination with a driven shaft having a gear thereon, of a drive shaft and a reversing shaft both parallel to said driven shaft, loose and tight pinions respectively mounted on said drive shaft and on said reversing shaft and permanently meshing with said gear on said driven shaft, and a sliding clutch member on said drive shaft having means for operatively connecting the latter to said loose pinion or to said reversing shaft, substantially as described.

4. In drive mechanism of the class described, the combination with a frame of a transverse shaft having a driven gear thereon, a transverse motor shaft, intermediate, parallel counter and reversing shafts, loose and tight pinions respectively mounted on said counter shaft and on said reversing shaft and permanently meshing with said driven gear, clutch controlled gearing for connecting said motor shaft and said counter shaft, a clutch member slidably mounted on and rotating with said counter shaft, coöperating gears on said sliding clutch member and said reversing shaft and means for shifting said clutch member from idle position to connect said coöperating gears or to connect said loose pinion to said counter shaft, substantially as described.

5. In drive mechanism of the class described, the combination with the frame of a transverse engine shaft journaled on said frame, a drive pinion and a belt pulley loosely mounted on opposite ends of said shaft, separate friction clutches for connecting said pulley and said pinion to said shaft, a driven member and clutch controlled gearing for connecting said pinion to said driven member, substantially as described.

DAVID P. DAVIES.

Witnesses:
HARRY L. CLAPP,
KATHARINE GERLACH.